W. L. MORRIS.
LUBRICANT CLEANING AND REPLENISHING SYSTEM FOR AUTOMOBILES.
APPLICATION FILED SEPT. 7, 1916.

1,337,408.

Patented Apr. 20, 1920.
7 SHEETS—SHEET 1.

Inventor—
William L. Morris

W. L. MORRIS.
LUBRICANT CLEANING AND REPLENISHING SYSTEM FOR AUTOMOBILES.
APPLICATION FILED SEPT. 7, 1916.
1,337,408.
Patented Apr. 20, 1920.
7 SHEETS—SHEET 3.
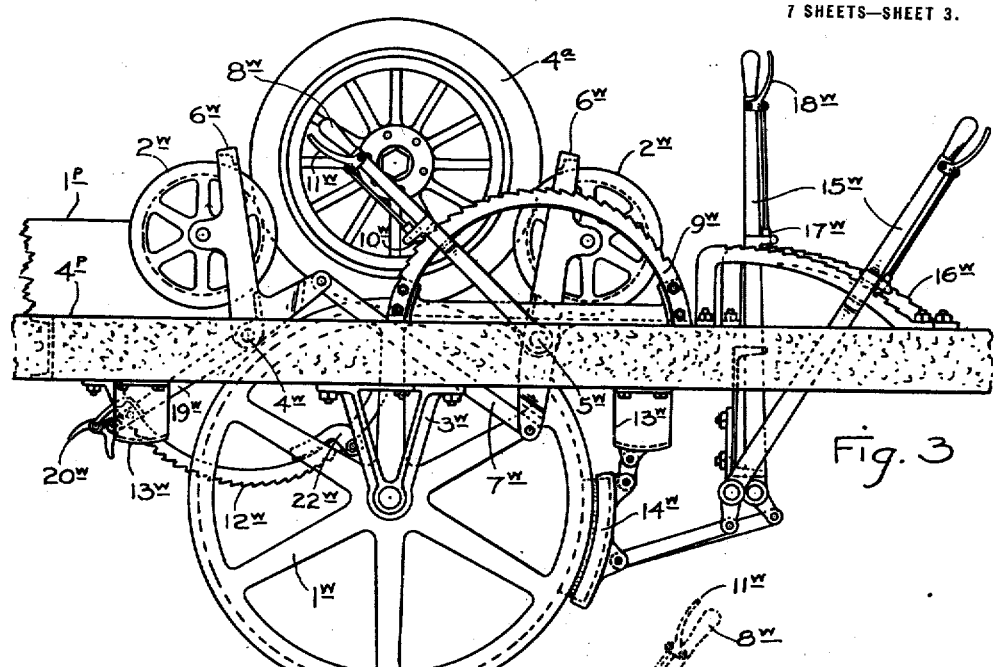
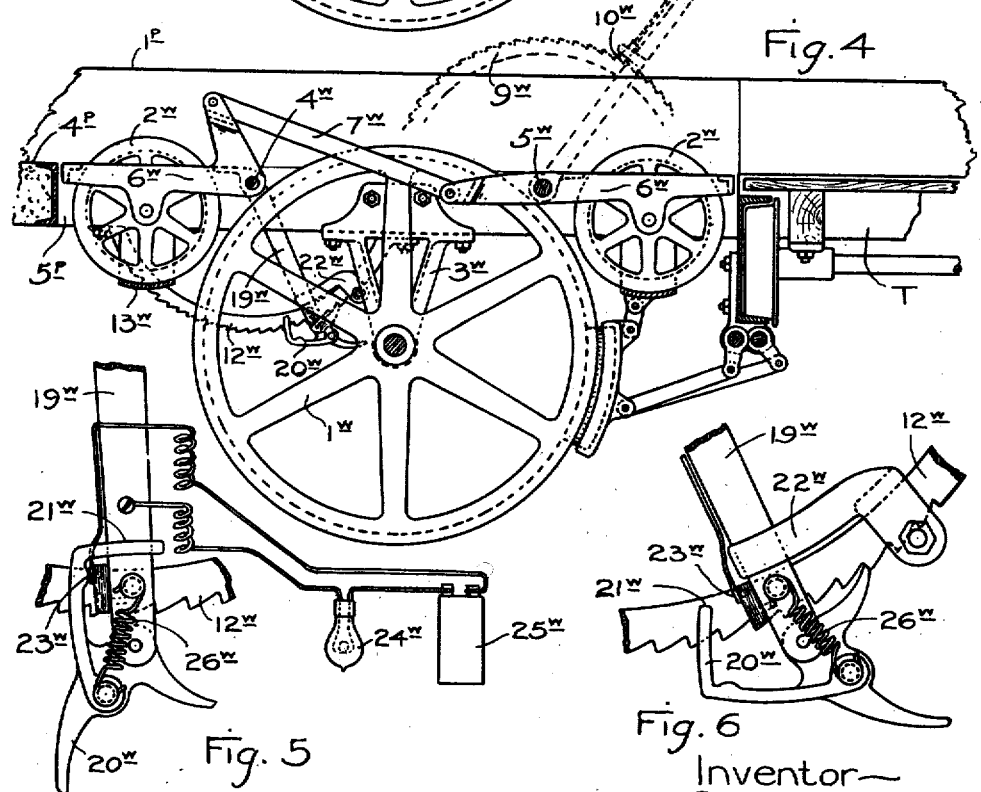
Inventor—
William L. Morris W. L. MORRIS.
LUBRICANT CLEANING AND REPLENISHING SYSTEM FOR AUTOMOBILES.
APPLICATION FILED SEPT. 7, 1916.
1,337,408.
Patented Apr. 20, 1920.
7 SHEETS—SHEET 4.
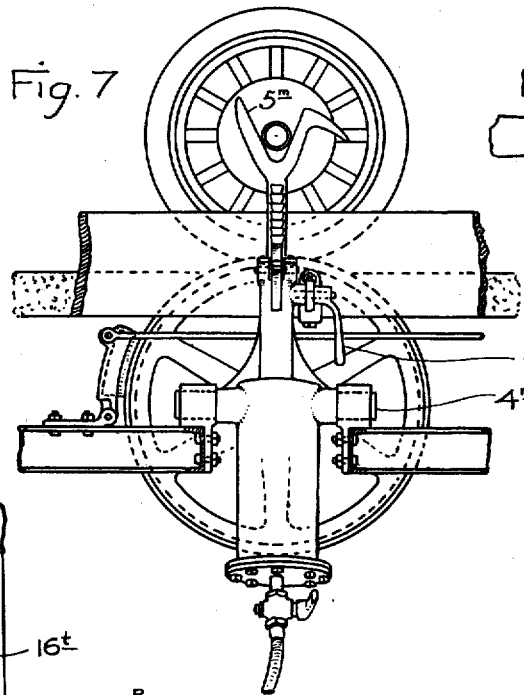
Fig. 7
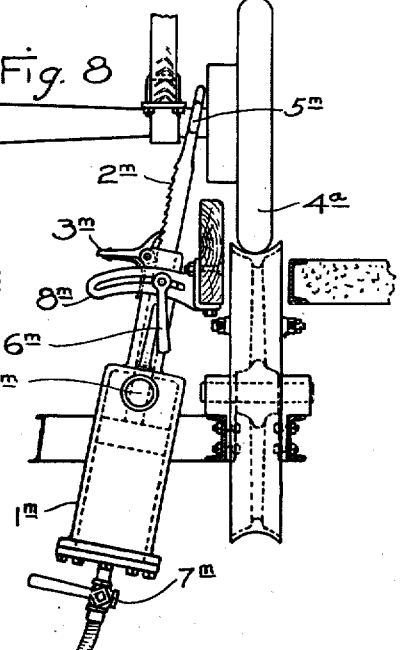
Fig. 8
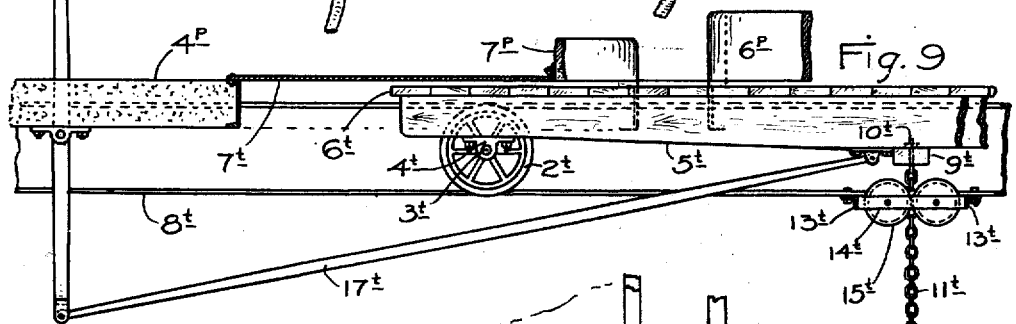
Fig. 9
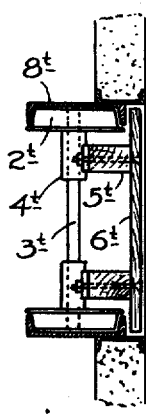
Fig. 11
Fig. 10
Inventor—
William L. Morris W. L. MORRIS.
LUBRICANT CLEANING AND REPLENISHING SYSTEM FOR AUTOMOBILES.
APPLICATION FILED SEPT. 7, 1916.
1,337,408.
Patented Apr. 20, 1920.
7 SHEETS—SHEET 5.
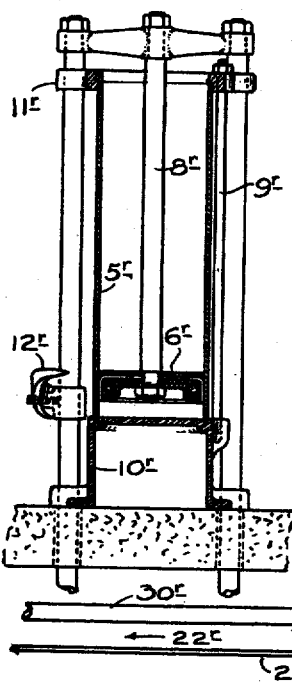
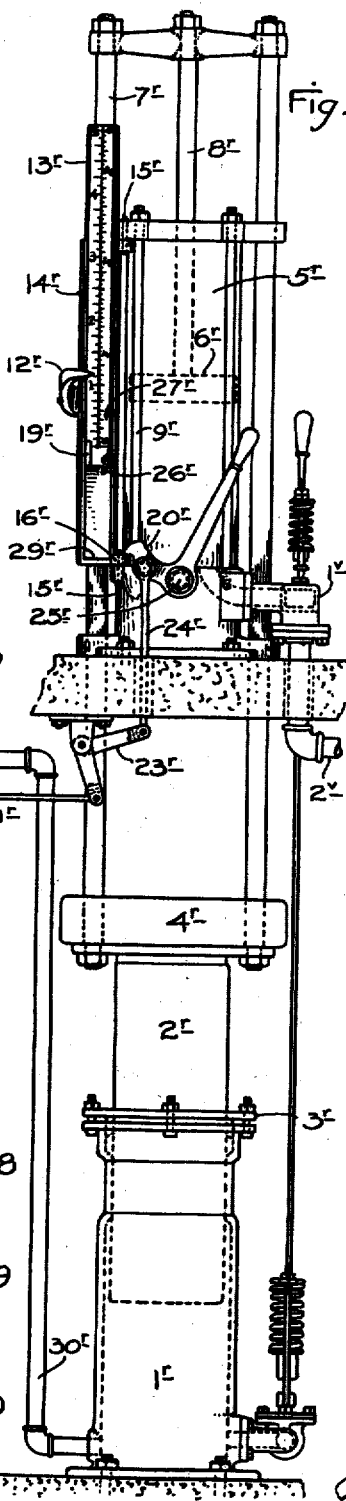
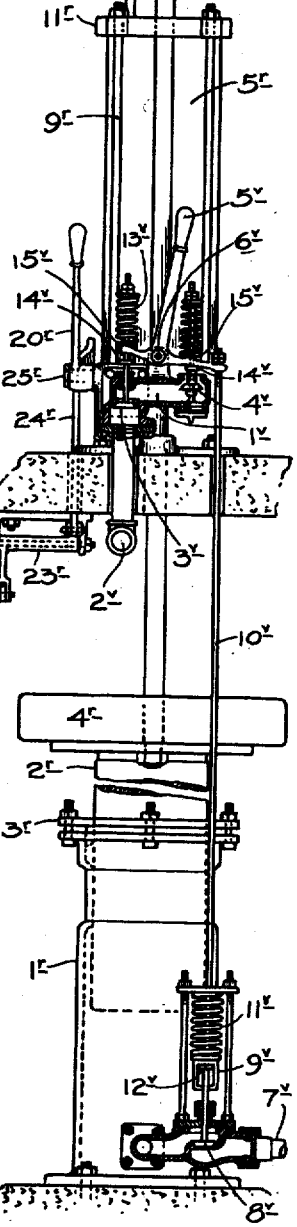
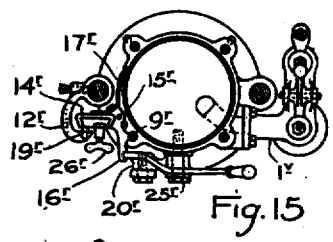
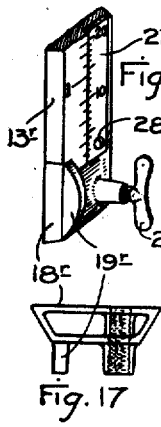
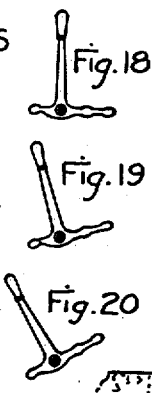
Inventor—
William L. Morris

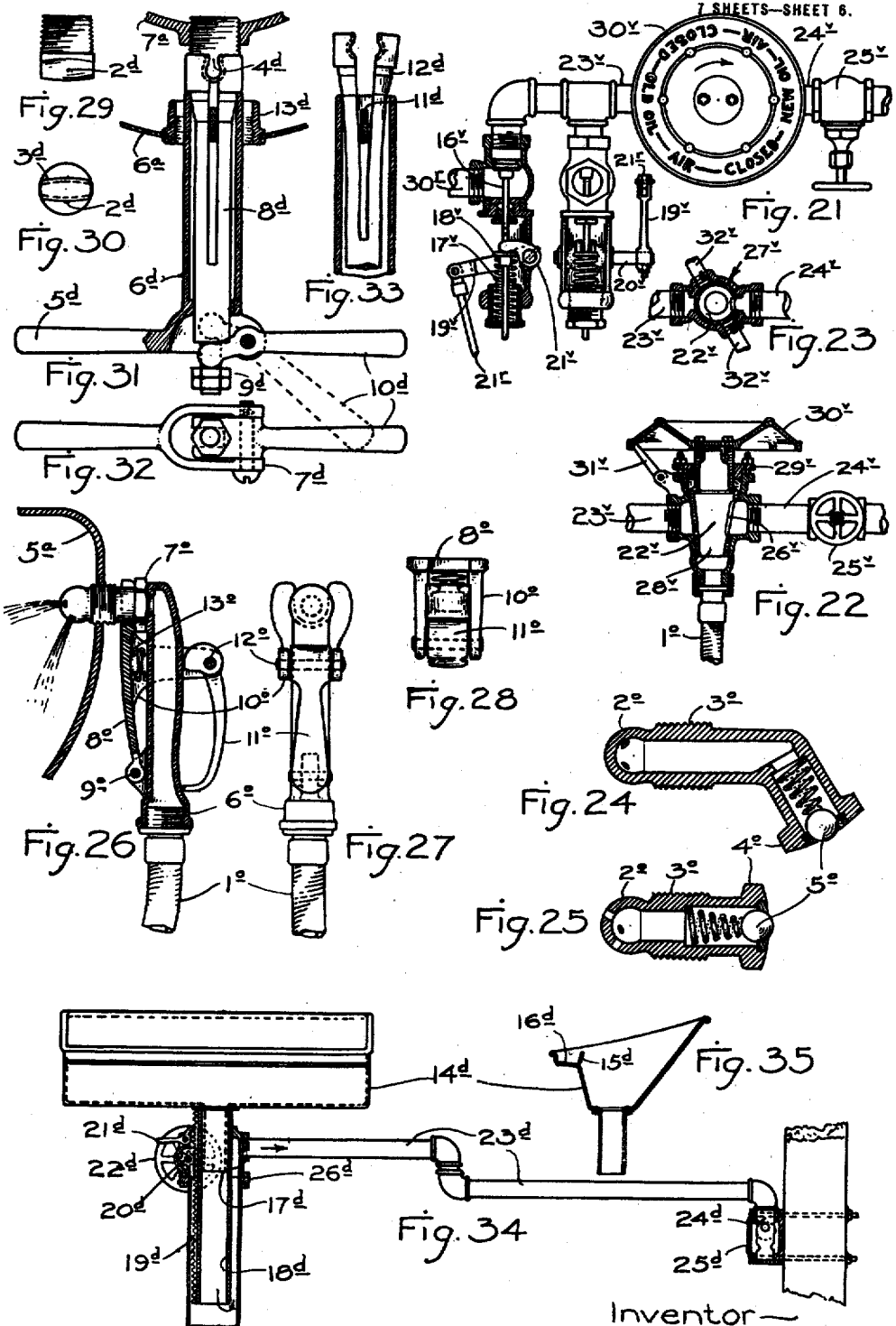

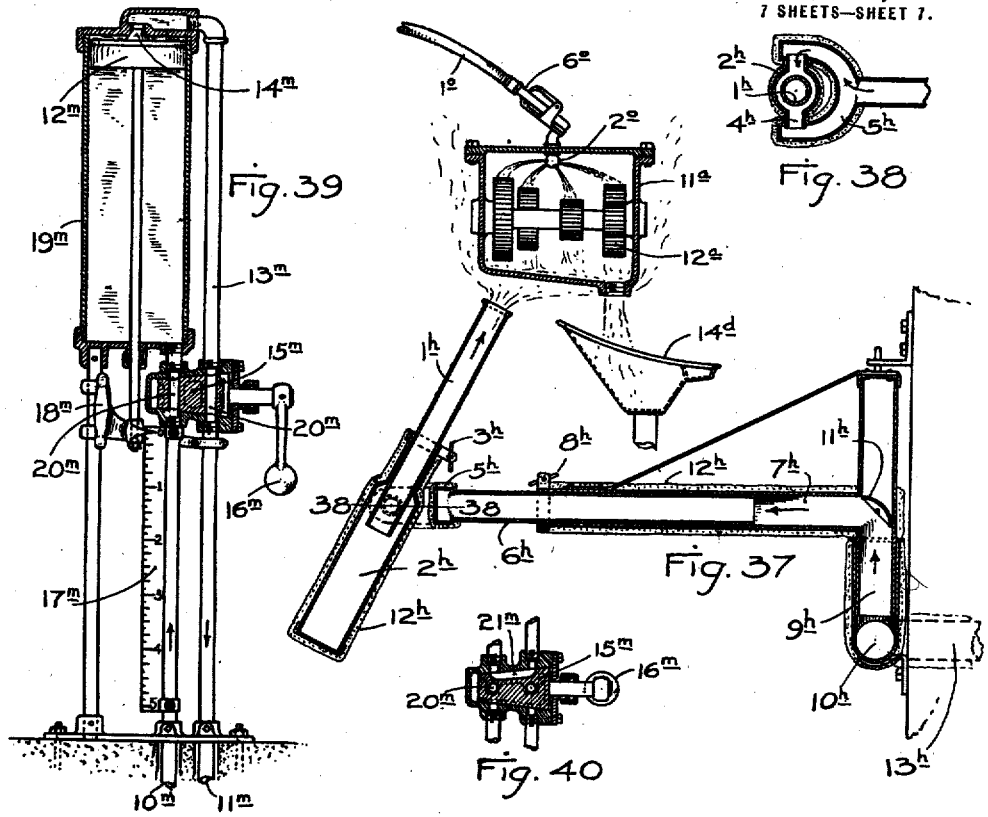

UNITED STATES PATENT OFFICE.

WILLIAM L. MORRIS, OF CHICAGO, ILLINOIS.

LUBRICANT CLEANING AND REPLENISHING SYSTEM FOR AUTOMOBILES.

1,337,408.  Specification of Letters Patent.  Patented Apr. 20, 1920.

Application filed September 7, 1916. Serial No. 118,850.

*To all whom it may concern:*

Be it known that I, WILLIAM L. MORRIS, a citizen of the United States, residing at Chicago, in the county of Cook and State of Illinois, have invented certain new and useful Improvements in Lubricant Cleaning and Replenishing Systems for Automobiles, of which the following is a specification.

This cleaner and replenisher is for the purpose of removing from automobiles the different batches of dirty oil or lubricant which have been reused for a considerable time, for cleaning out the cases and mechanism fouled by the re-use of such oil, and for replacing a proper amount of clear, pure lubricant. The invention consists in the construction, combination, and arrangement of the several parts and devices which make up the equipment for enabling the above mentioned operations to be done thoroughly and quickly, and with greater facility and safety.

The entire system is designed, arranged, and intended particularly for automobiles, and the novelty and newness of the various parts appertain specially to automobiles. The term automobile is intended to cover the various types of self-propelled vehicles.

Figure 1:
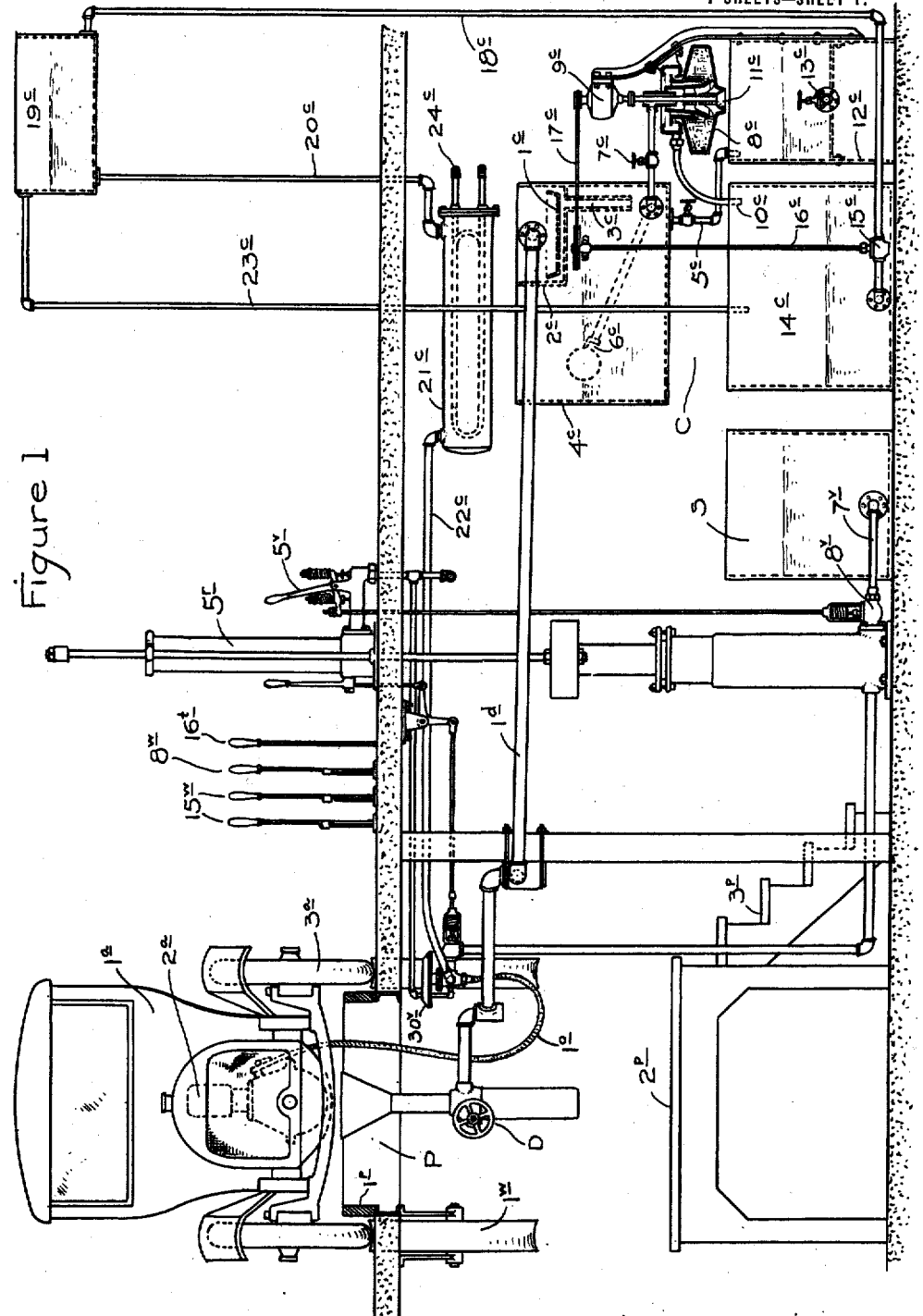
Figure 2:
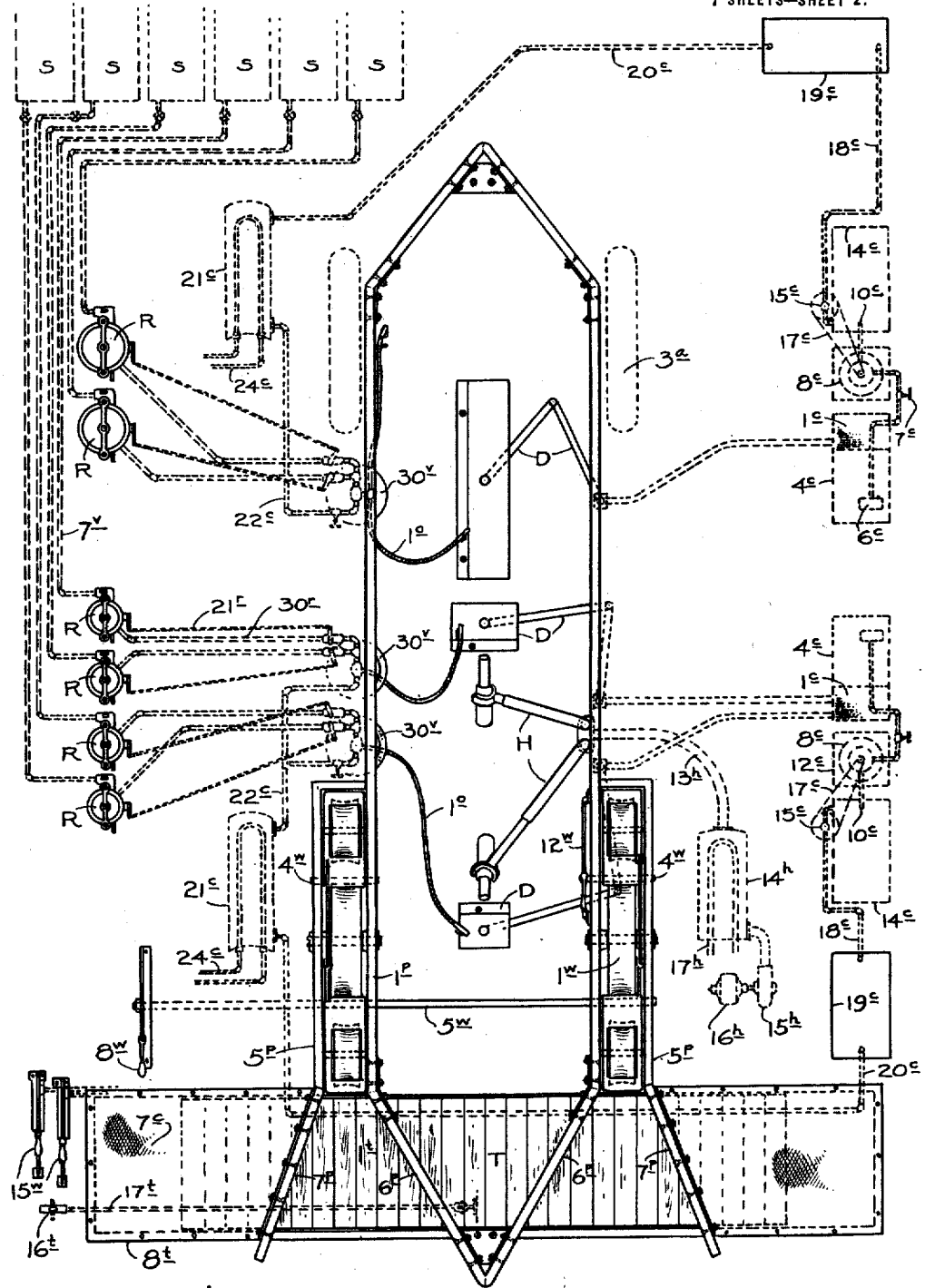

In the accompanying drawings, Figure 1, is a view showing the general arrangement of the parts in elevation with some detailed features of the clarifying system; Fig. 2, is a plan view showing generally the various parts and their positions, the details being shown in succeeding views; Fig. 3, is a view of the wheel locking mechanism in one position; Fig. 4, is another view of this mechanism in another position; Fig. 5, is a detail of an interlock lever and a visible signal operated thereby; Fig. 6, is a view of this lever in a different position; Figs. 7 and 8 are front elevation and side view, respectively, of a modified wheel locking mechanism; Figs. 9, 10, and 11 are side, plan, and sectional views respectively of the shifting table and pit curb; Fig. 12, is a sectional view of one of the lubricant supply cylinders; Fig. 13, is an elevation of one of the lubricant supply cylinders and its connected parts; Fig. 14, is another view partly in section of the same; Fig. 15 is a transverse section of one of the cylinders; Fig. 16 is a perspective of a part of the quantity setting mechanism; Fig. 17, is a cross-section of the parts shown by Fig. 16; Figs. 18, 19, and 20 show different angular positions of one of the supply cylinder operating levers another position being shown in Fig. 14; Fig. 21 is a view partly in section of the pitman's valve and the clean oil stop valves which are automatically closed; Fig. 22 is a sectional view of the pitman's valve; Fig. 23 is a plan view showing the connections of this valve; Figs. 24 and 25 are sectional views of oil feeding nozzles; Fig. 26 is a sectional view of a clamping device; Fig. 27 is an elevation of this device; Fig. 28 is an end view of this device; Figs. 29 and 30 are side and top views respectively of a drip plug; Fig. 31 shows a tool parts in section, of a plug removing device; Fig. 32 is an end view of the device; Fig. 33 is a view of a portion of the device when spread; Fig. 34 is a view of the adjustable drip pan; Fig. 35 is a section of the pan; Fig. 36 shows an engine with feeding and drip attachments in position; Fig. 37 shows a hot blast connection applied to a transmission case; Fig. 38, is a section taken on the line 38—38 of Fig. 37; Fig. 39, is a view of a modification of the self-measuring replenishing device; and Fig. 40 is a sectional view of a valve plug of the device in a different position than shown in Fig. 39.

The crank and gear cases of automobiles are now cleaned in garages by draining out the oil and removing as much impurity as will loosen by running a small amount of kerosene through the cases. To thoroughly clean the cases at present, it is necessary to remove the parts so they can be immersed in gasolene and the collected grease, gum, and dirt removed with a swab.

To clean automobile crank and gear cases thoroughly and quickly requires many appliances all of which must be specially arranged for this purpose, and no one device alone will effect the desired result.

By the present invention it is contemplated that a car will be thoroughly cleaned and the lubricant replenished in 15 minutes, and as the success of this system depends upon speed as well as quality of work done, the various parts that facilitate and expedite the work are as vital factors as those that insure superior performance. For example, the shifting table shown in Figs. 2, 9, 10, and 11, is not in itself a cleaning device, but it is a time saving and safety insuring device which facilitates the operation and thus actually combines with the other parts of this cleaning and replenishing system.

Ordinarily the lubricant used in the gear cases is more viscid than that used in the crank case, and at 200 degrees Fahr. its viscosity is about the same as the crank case oil at 100 degrees. Heating coils though not shown, may be required in the clarifying tanks. These coils would further aid in raising the temperature of the cleaning oil and make the deposits in different lubricant containers more fluid and less adhesive, enabling them to be washed off and carried away with the cleaning oil. A very large quantity of cleaning oil would be circulated, which would carry more heat, have a greater washing effect and insure keeping the drain lines clean. To further aid in quickly raising the temperature of the gear cases, more particularly in cold weather, a hot air blast would be used, which would assist in keeping these cases very hot so that the impurities will loosen and leave the parts. Furthermore, the back wheel supports are arranged so that the gearing can be kept in motion while it is being cleaned.

Not only is this a new and novel system of cleaning and replenishing, but also the attachments placed on the automobile and used in conjunction therewith are new and novel, even though they be used in conjunction with a system of cleaning and replenishing that is entirely different from that shown. It will be noted first that an automobile must be equipped with such oil feeders as shown by Figs. 24 or 25 and drain plugs as shown by Fig. 30, and holes in the drip pans as shown by Fig. 31, before it can go over the cleaning pit and derive the benefits of this system.

For convenience, the different elements or groups of parts of this system will be designated with a large letter, and the detailed references of each group will be numbered serially with the small letter of the group as an exponent.

In Fig. 1 a front view of an automobile $1^a$ is shown, the engine being indicated by dotted lines $2^a$. Under the car is a pit P which has upwardly projecting sides or curbs $1^p$. A platform $2^p$ below the pit is to enable the operator to reach the parts under the car, with a stairway $3^p$ leading up to the same. This figure shows only the supporting wheels $1^w$ of the automobile back wheel support. The back wheel shifting table is not shown in this figure, but the clarifying system designated by exponent "c" is shown most fully in Fig. 1, and partly in Fig. 2.

Dirty oil enters the clarifying system through a screen $1^c$ which is in a compartment $2^c$, which has a discharge $3^c$ into lower part of precipitating tank $4^c$ with means to draw off precipitation through a connection $5^c$. A floating discharge $6^c$ delivers an amount of oil as regulated by a valve $7^c$ to a centrifugal separator $8^c$ which has a motor $9^c$ and a discharge $10^c$. This centrifugal separator or precipitator has a bottom discharge $11^c$ through which it can discharge its contents to a residue oil tank $12^c$ when the motor is stopped. This residue oil then can be run into barrels or other receptacles through a valve $13^c$. The oil leaving the centrifugal separator through its discharge $10^c$ is delivered to a tank $14^c$ and by means of a pump $15^c$, a vertical shaft $16^c$ and a belt $17^c$, it is driven from the motor $9^c$, delivering the oil through pipe line $18^c$ to the overhead gravity tank $19^c$. The oil from the gravity tank is fed through a pipe line $20^c$ to an oil heater $21^c$ and thence to the oil feeders through line $22^c$. The pipe line $23^c$ prevents gravity tank $19^c$ from overflowing. The heater $21^c$ is shown with a heating coil $24^c$. A plurality of drip catching devices D, deliver the drippings from the automobile through the pipe line $1^d$ to the clarifying system C.

An oil feeder hose O, and a valve V, supplies both the cleaning oil and the oil to replenish the automobile lubricating system. In Figs. 1 and 2, R designates the clean oil replenishing devices, and V the special oil valves, both fully shown by later figures; S designates the storage tanks for clean oil.

The cleaning oil tank $19^c$ is shown in Fig. 1 as an overhead gravity tank; this may be a closed pressure tank in basement with confined air over the oil. Fig. 2 shows the two clarifying systems, both alike in general equipment, one used for the engine system, the other for the transmission and the differential gear cases. The old oil from the crank cases may be used for both systems. In case but one system is used for both engine and gear cases, very fair results are obtained. The gear cases, however, are more readily cleaned by using a very hot oil and the crank case cleaning is more exacting than for the gear cases, ordinarily making the use of two systems advisable. Since all the parts shown in this plan view Fig. 2, are more clearly shown in detail, the various parts will be referred to in this figure while describing the details. This view shows the oil feeders and drains, also the hot blast as they would be positioned with a car over the pit, but the two front wheels shown dotted as $3^a$ are the only parts of the automobile appearing in this view. All that shown by solid lines is on the first or machine room floor excepting the two gravity tanks $19^c$, they being at an elevation. That shown by dotted lines is in the basement, except the auto wheels $3^a$.

The rear wheel support and locking mechanism is shown in detail by Figs. 3, 4, 5, and 6. In the floor $4^p$ is the pit P with a curbing $1^p$ at the sides and rectangular openings $5^p$ at each side of the pit. At the openings are bearings $3^w$ to support idler wheels $1^w$;

one for each rear wheel 4ª of the automobile, the upper edge of the wheels 1ʷ being substantially flush with the surface of the floor 4ᵖ and preferably flanged to seat the automobile wheels. Pivoted in bearings at each side of the openings 5ᵖ are short shafts 4ʷ and a long through shaft 5ʷ, also shown in Fig. 2. These shafts carry guide wheel frames 6ʷ which swivel with the shafts. Two of these guide frames are attached to the through shaft 5ʷ and the other two are operated by means of connecting rods 7ʷ pivoted to lever arms projecting from the frames 6ʷ. A hand lever 8ʷ is attached to shaft 5ʷ for raising and lowering the four guide wheels 2ʷ. A ratchet segment 9ʷ together with ratchet dogs 10ʷ and dog levers 11ʷ permit raising of the guide wheels 2ʷ up against the automobile wheels of different diameter and holding them in their correct position. In addition to the ratchet segment 9ʷ there is an interlocking segment 12ʷ which must be released from below the floor before lever 8ʷ can be operated. The guide wheels 2ʷ rest upon saddle hangers 13ʷ when they are in their lowermost position ready for car to pass over, and prevent the guide wheels from being rotated by the traction of the auto wheels. The two supporting wheels 1ʷ may both be attached to a common shaft by means of a clutch, this not being shown. A brake block 14ʷ is provided for each wheel 1ʷ, so that one wheel can be stopped to fill its tire with air, while the other is rotating at double its former speed, thus aiding to clean impurity from the differential gears. The brake levers 15ʷ and 18ʷ are for separately controlling the brake blocks 14ʷ, and they both have segments 16ʷ, dogs 17ʷ, and dog release levers 18ʷ the same as for lever 8ʷ.

An interlock lever 19ʷ shown in Figs. 5 and 6 has a special ratchet dog 20ʷ shaped with a projecting end 21ʷ which engages with the end of a knockback stationary stop 22ʷ which is clamped to the segment 12ʷ. The dog 20ʷ is hand released by another operator in the pit and assumes the position shown in Fig. 3 when released, and when so positioned permits the operation of lever 8ʷ to release the guide wheels 2ʷ. When the dog 20ʷ is out of engagement with its ratchet segment 12ʷ, it is pressed by a spring 26ʷ to close a circuit with an electrical contact 23ʷ and closes either an alarm or a light circuit. Fig. 5 shows a signal lamp 24ʷ and a battery 25ʷ. The tension spring 26ʷ is connected to hold the dog to its place when in either of the two extreme positions. The knock over stop 22ʷ is placed so it will throw the dog 20ʷ over and into engagement with the ratchet segment 12ʷ when wheels 2ʷ are entirely down. The teeth in segment 12ʷ can be omitted at the position shown by Fig. 6, as the interlock is required only when guide wheels 2ʷ are raised. A portion of the shifter table T is shown in Fig. 4, and Fig. 2 shows location of the rocker shaft 4ʷ and the interlocking segment 12ʷ in the pit P.

A modified form of wheel lock is shown by Figs. 7 and 8, using two air cylinders 1ᵐ to raise two forked retainers 2ᵐ in which rear automobile wheels 4ª are held, with ratchet dog 3ᵐ to prevent the retainers from lowering. Trunnions 4ᵐ for each cylinder permit swinging forks 5ᵐ along the axle to such a point as it is clear of obstruction. A slotted segment 8ᵐ and a clamping device 6ᵐ permit adjusting and locking the cylinder at such an angle as it is set. A 3-way valve 7ᵐ permits admitting or discharging the air from each cylinder.

The shifter table is shown in detail by Figs. 9, 10, and 11. The table proper 1ᵗ has four wheels 2ᵗ attached to axles 3ᵗ which rotate in bearings 4ᵗ placed under stringers 5ᵗ with covering flooring 6ᵗ which passes under a steel plate 7ᵗ at each end. The curbs 6ᵖ extend from the sides of the pit toward each other and are supported at the ends but kept up out of the way of the table 1ᵗ. Attached to the floor plates 7ᵗ are divergent curbs 7ᵖ, one on the outside of each curb 6ᵖ. The wheels 2ᵗ run inside of steel channels 8ᵗ, resting on the lower flange thereof. A cross-bar 9ᵗ is attached to the stringers 5ᵗ at the center of the table and suspended therefrom is an eye bolt 10ᵗ, a chain 11ᵗ, and a weight 12ᵗ. A pair of angle irons 13ᵗ are supported by the channels 8ᵗ and attached between these angles are bearing supports 14ᵗ for wheels 15ᵗ, the weight 12ᵗ being suspended by its chain 11ᵗ between the wheels and serving to return the table 1ᵗ back to its central position. Ordinarily and for slight registering movement this table would be shifted automatically by the tires of the automobile bearing against the curb 6ᵖ or 7ᵖ but to enable its being shifted by hand, a lever 16ᵗ and a connecting rod 17ᵗ are provided operable from above the floor surface 4ᵖ.

The replenisher, or lubricant supply and measuring device designated by the exponent "r" is more clearly shown in Figs. 12 to 20. A lubricant cylinder 1ʳ (Fig. 13) has a plunger 2ʳ with a stuffing box and gland 3ʳ therefore, and the plunger is weighted down as an accumulator with weight 4ʳ. This lubricant plunger is raised with an air or hydraulic cylinder 5ʳ and its piston 6ʳ by means of lifter rods 7ʳ and piston rod 8ʳ. Clamp rods 9ʳ permit the use of a light cylinder casing 5ʳ clamped between a base casting 10ʳ and an upper ring 11ʳ though these parts may be a single casting if desired. Secured to the left hand suspension rod 7ʳ is a marker 12ʳ which travels downward in unison with plunger 2ʳ as the lubricant leaves the lower cylinder 1ʳ. A scale 13ʳ fits in dovetail guides in a vertical scale support 14ʳ. This support has no vertical movement but can swing on its bearing pins 15$^r$, an arm 16$^r$ (see Fig. 15) being a part of this support 14$^r$ which stops against the left hand front clamp rod 9$^r$, being normally kept against this rod by means of spring 17$^r$. At the lower end of the wood scale bar 13$^r$ is a dovetail shape, metal ring or ferrule 18$^r$ shown Figs. 16 and 17 in which the lower end of the scale bar is secured. This ferrule 18$^r$ has a cam 19$^r$ formed on its front face which engages marker 12$^r$ and presses the swing support 14$^r$ back and draws the end 16$^r$ away from a lever 20$^r$ allowing it to drop. A rod 21$^r$ is connected to a spring loaded oil valve 16$^v$ shown in Fig. 21 and the tension on the valve spring pulls the rod as indicated by the arrow 22$^r$ in Fig. 13. A bell crank 23$^r$ and a link connection 24$^r$ communicate motion from the spring closed valve to lever 20$^r$ which is pivoted on a screw 25$^r$. A set screw 26$^r$ at lower end of scale bar 13$^r$ locks the scale for the quantity desired and the scale is immovable vertically while so locked. The scale bar 13$^r$ is graduated in gallons to show the quantity of lubricant displaced by the ram 2$^r$. A set of different price computing scales 27$^r$ (Fig. 16) are arranged to be attached in a recess of the scale bar 13$^r$ with screws 28$^r$ at each end; they are graduated to show in dollars and cents the values of the different quantities; each computing scale is known by its price per gallon. When the scale bar 13$^r$ is at its lowest position, bearing against a shoulder 29$^r$ (Fig. 13) and the plunger 2$^r$ is also at its lowest position, the marker 12$^r$ will register with zero on the scale. At no time can the scale 13$^r$ be set for more gallons than can be obtained from cylinder 1$^r$. The discharge pipe line from the oil cylinder 1$^r$ is indicated by 30$^r$, and this line extends to the spring loaded valves shown in Fig. 21.

The special oil valve parts are designated by the exponent "v". In Figs. 13, 14, and 15 the valve body 1$^v$ is shown attached to the upper operating cylinder and is shown suitable to use air; it would be necessary to inclose the vent outlet in case water pressure be used. This is a double valve, the air under pressure being received through a pipe line 2$^v$. The air valve is designated 3$^v$ and the vent 4$^v$. An operating lever 5$^v$ for the air and vent valves is pivoted on a pin 6$^v$. An oil valve 8$^v$ which admits the lubricant to cylinder 1$^r$ is intended to be open only when the air pressure in cylinder 5$^r$ is sufficient to raise the ram and to be closed before the weighted plunger 2$^r$ places any pressure on the oil in the cylinder, which would cause oil to flow back in the line 7$^v$ connected to valve 8$^v$. The oil valve 8$^v$ can close and open the same as any check valve, within certain positions of the operating lever 5$^v$. An oil valve lifting block 9$^v$ is attached to the lower end of a lifter rod 10$^v$ and an oil valve spring 11$^v$ bears downward upon same. The oil valve 8$^v$ has a stem attached with a head 12$^v$ at its upper end; this head is free to move vertically within fixed limits in the block 9$^v$. The spring 11$^v$ is strong enough to overcome the compression of an air valve spring 13$^v$ which bears against one end of lever 5$^v$. The air and vent valves 3$^v$ and 4$^v$ have collars 14$^v$ which are fixed on their valve stems and also spring washers 15$^v$ which are free to move up and down on the stem. A continued movement of the lever 5$^v$ is therefore possible after the air or vent valve is closed, by compressing the springs 13$^v$. The normal position of the lever 5$^v$ and the valves is shown by Fig. 14, in which the valves 3$^v$ and 8$^v$ are closed and the vent 4$^v$ is open; when the lever is operated to the position shown by Fig. 18, the air valve 3$^v$ is closed, the vent 4$^v$ is closed, and the oil valve 8$^v$ is still closed, and the loose connection of the block 9$^v$ is partly taken up; when the lever is moved to the position shown by Fig. 19, the vent 4$^v$ is closed, air valve 3$^v$ is opened, and the oil valve 8$^v$ is slightly opened, causing the plunger 2$^r$ and the piston 6$^r$ to rise; and in the position shown by Fig. 20, the valves 3$^v$ and 8$^v$ are entirely opened, the vent 4$^v$ is closed. When the cylinder 1$^r$ has been filled with oil, the lever 5$^v$ is released, and the oil valve 8$^v$ is closed while air is still under pressure in the cylinder 5$^r$. If the scale 13$^r$ is at its lowest position and left there then the lever 5$^v$ would be held open long enough to draw only the desired amount of lubricant into cylinder 1$^r$, this amount showing by the pointer 12$^r$. This is merely another way of operating this measuring device.

Fig. 21 shows valves 16$^v$ for closing the discharge 30$^r$ from the oil cylinder 1$^r$ shown Fig. 13. A separate valve 16$^v$ is used for each self measuring cylinder, and as many cylinders are used as there are different kinds of lubricant to supply. These valves are each closed by means of a spring 17$^v$ which thrusts against collar 18$^v$ attached to the valve stem. A lever 19$^v$ is actuated by the pull rod 21$^r$, shown in Fig. 13, and the motion of the lever 19$^v$ is transmitted through a rock shaft 20$^v$ and a short lever 21$^v$ to the collar 18$^v$ on stem of valve 16$^v$.

The special cock or plug valve 22$^v$ shown in Figs. 21, 22, and 23 has a single pipe opening 23$^v$ to all the new or clean oil valves 16$^v$, also a pipe opening 24$^v$ to the cleaning oil connection which has a standard valve 25$^v$ set for the desired rate of flow from the gravity tank 19$^e$ in Figs. 1 and 2. The starting position of the plug cock 22$^v$ remaining the same from the time one car leaves the pit until another is in position, is with a single side port 26$^v$ opening toward the shut off position indicated by arrow 27$^v$ in Fig.

21. The plug cock 22$^v$ has but two openings, a side opening 26$^v$ and a bottom opening 28$^v$, the bottom opening always being in communication with an oil supply hose 1°. The plug cock is held in position and made tight with a packing gland 29$^v$ and is operated by a hand wheel 30$^v$ which has a pawl 31$^v$ engaging in notches in the hand wheel. Air connections are made to the plug valve through the two pipes 32$^v$ (see Fig. 23.) In the operation of this plug valve, the air is opened after valve has closed from the oil and just before reaching the closed position. This permits blowing the oil out of the hose, avoiding waste and sloppage. The plug valve in Figs. 21 and 22 is positioned to receive the old cleaning oil.

For oil fittings the exponent "o" is used. Figs. 24 25 show the type of fittings which are attached to the crank, transmission, and differential cases, to supply streams of oil which are directed to the different parts to be lubricated. These fittings prevent the necessity of making many small and difficult oil connections to the different bearings, and though it would be quite an inoperative means of supplying oil for regular service, it is ample for the short time and with the excessive amount of oil used while cleaning out the cases. Each fitting comprises a nozzle head 2°; a threaded attachment 3°, a clamping head 4°, and a self closing valve or check 5°. The clamping head may be spherical or any shape suitable for a clamping attachment. Fig. 26 shows the same style fitting as shown in Fig. 25 applied to a casing 5$^a$. Figs. 26, 27, 28 show a quick action clamping device at the end of the oil supply pipe 1°; Fig. 26 is a longitudinal section of Fig. 27 and Fig. 28 is an end view at the clamping end. The oil supply hose 1° is attached to the clamp device body 6° having a tight joint making face at 7° which is held tightly against the fitting as shown by Figs. 24 or 25 by means of an open ended clamp fork 8° which is pivoted at 9° and has two side lugs 10° with a cam lever 11° pivoted at 12° to draw the clamp and body together. A spring 13° opens the clamp for disengaging it.

A side elevation, Fig. 29, and a plan view, Fig. 30, shows a drain plug with a special head or connecting end. This head is thicker in the center 2$^d$ than at the ends 3$^d$ which prevents it from moving sidewise in a holder as shown by Fig. 31, and this head is undercut and thinnest at 4$^d$ as shown in Fig. 31, which prevents it from pulling off the holder. The form of this plug also permits the use of a standard monkey wrench. It is understood that any suitable valve may be substituted for the drain plug, and that opening it is equivalent to removing the plug.

The plug wrench which attaches securely to the plug driver head is shown by Fig 31 which is a longitudinal section through the holder; Fig. 32 is an underside view, and Fig. 33 shows the collet released. A left handle 5$^d$, sleeve 6$^d$, and lugs 7$^d$ are all shown in one piece, with a split collet clamp 8$^d$ in the sleeve reduced at its lower end and threaded to engage two nuts 9$^d$. A movable lever 10$^d$ assumes the position shown by dotted lines in Fig. 31 when collet is open, and takes the full line position when the head of a plug is engaged.

A cross key 11$^d$ prevents collet from turning and parallel or straight side 12$^d$ enters sleeve 6$^d$ when in closed position and avoids danger of collet shifting in sleeve even if the hand were removed from lever 10$^d$. The ordinary engine drip pan 6$^a$ below the engine crank case 7$^a$, as shown in Fig. 31, has a ferrule 13$^d$ around the opening which is cut in the pan, thereby, enabling the operator in the pit to reach the drain plugs without disturbing the pan.

A drip catching device 14$^d$ is shown in Fig. 34 which is swung under the drain openings, where there are a number of drains, such as, under the engine, a longer drip trough can be used, long enough to catch all these drains in one trough or pan. A sectional view, Fig. 35, of this drip catching device shows a partition 15$^d$ with openings along its bottom edge, making a retainer for a shelf 16$^d$ on which the plugs removed from the drains may be placed. At the bottom of the trough is a nipple 17$^d$ (Fig. 34) which is rotatable in a pipe 18$^d$, this pipe having a rack 19$^d$ attached along its side with a pinion 20$^d$ engaging it, and a ratchet 21$^d$ kept engaged with rack by a spring. A hand wheel 22$^d$ attached to the pinion is rotatable for raising or lowering the trough pan 14$^d$, and the ratchet dog 21$^d$ holds it in any adjusted position. Oil pipes 23$^d$ swing in a horizontal plane on the pipe threads at a pair of connecting elbows and also on a nipple 24$^d$ which is supported by a drain box 25$^d$, anchored to a supporting column. Attached to the other end of the pipes 23$^d$ is a casing 26$^d$ upon which the hand wheel 22$^d$ and the pinion 20$^d$ are mounted for raising and lowering the trough 14$^d$ and its pipe 18$^d$ in the casing 26$^d$. The drips pass down through the pipe 18$^d$ and rise up in the casing 26$^d$ and pass out of pipes 23$^d$.

An engine 2$^a$ is shown in Fig. 36 arranged to take oil supply through a valve connection 14° also through one of the regular nozzle fittings 2° as shown in Figs. 24 and 25. A clamping end such as indicated 4° on Figs. 24 and 25 would be formed on the end of the valve connection 14° to attach the clamping device shown in Fig. 26. An engine fitted as shown would require two supply hose connections 1°, one for each oil feeding device. The automobile oil pump is indicated as $8^a$, the oil discharge line from the pump $9^a$, and the distributing force feed system $10^a$. Engines which are arranged to pick up oil by means of dippers at the lower end of connecting rods are generally so arranged that oil can be fed from the stream nozzle $2^o$ so it will reach the bearings. This stream feeder $2^o$ is necessary for washing down the case and mechanism though ordinary lubrication may be otherwise supplied. The number, size and location of openings in the nozzle $2^o$ is necessary for washing down the case and mechanism though ordinary lubrication may be otherwise supplied. The number, size and location of openings in the nozzle $2^o$ is determined by experiment and demonstration for different engine makes and sizes, and when it can properly take care of the journals and cleaning, it becomes a standard for this particular application. The engine drip pan $6^a$ is similar to that shown by Fig. 31, and also the position of the drip trough $14^d$ which is similar to that shown in Figs. 34 and 35.

The hot air blast is shown in Fig. 37 as directed upon the transmission case $11^a$ in which are gears $12^a$. The oil feeder nozzle $2^o$ is like that shown in Fig. 24 and the hose $1^o$ has the clamping device $6^o$ as shown in Fig. 26. The drain pan $14^d$ is the same as that shown in Fig. 34. The hot blast is generally designated by the letter H, and is so indicated in Fig. 2. A nozzle pipe $1^h$ is vertically adjustable in a cylinder $2^h$ and is held in position by a clamp screw $3^h$. Fig. 38 is a plan section on line 38—38 of Fig. 37. Trunnion ends $4^h$ rotate in a yoke $5^h$ at the end of a horizontal pipe $6^h$. This pipe $6^h$ rotates and slides in a horizontal pipe $7^h$, and a clamp screw $8^h$ is provided to lock it in the set position. The horizontal pipe $7^h$ is attached to a vertical rotatable pipe $9^h$ which swivels in the stationary air blast pipes $10^h$. In the vertical pipe $9^h$ is a damper $11^h$ which regulates the quantity of air passing through the blast pipe and under the gear case. The pipes are covered with non-conducting material $12^h$. The hot air pipe line $13^h$ is also shown in Fig. 2 with an air heater $14^h$, a blower $15^h$, and a motor $16^h$. The heater $14^h$ has heating pipes or flues $17^h$ to raise air to a very high temperature.

Instead of using heated air to warm the gear cases, steam may be used in much the same manner, possibly very low pressure but superheated.

The clean oil storage tanks S as shown in Figs. 1 and 2 are connected by pipe lines $7^v$ to the oil valves $8^v$ shown in Fig. 14. Ordinarily new oil would be in the tanks S, but if desired, clarified old oil may be in one or more of these tanks.

The modified form of replenisher shown in Figs. 39 and 40 would be used in conjunction with a pressure tank for heavy oils and from overhead gravity tanks for light oils. This device would be placed in the line to the oil supply merely as a measuring device, the piston being interposed and traveling with the oil and when piston is stopped, the oil stops flowing also. The pipe line $10^m$ is the oil line from the gravity or pressure tank and $11^m$ is the supply line to the automobile oil case. The piston $12^m$ moves in a cylinder $19^m$ which receives oil under pressure from below and discharges from the top through a connection $13^m$, a valve $14^m$ being attached to the piston and closes discharge when piston is at the top. The special cock $15^m$ has two positions, Fig. 39 showing its normal standing position with the pipe line $10^m$ connected to the underside of the piston and $11^m$ to top of piston through perforations $20^m$. When a weighted lever $16^m$ is raised, the valve will be as shown Fig. 40, with the lines $10^m$ and $11^m$ closed and the top and bottom of measuring piston equalized through a passage $21^m$ in the cock allowing piston to drop to such quantity lubricant as desired, which shows on scale $17^m$. In case the valve $15^m$ is held in position shown by Fig. 40 longer than was necessary for the amount desired, then piston would have to be raised; a handle $18^m$ permits raising the piston as desired. A computing scale similar to scale $27^r$ (Figs. 13 and 16) may be also used if desired.

In operation, a car to be cleaned and replenished with lubricant is run over the pit P, passing first over the movable platform T, the front and back wheels being guided by the curbs $6^p$ and $7^p$ and the platform being moved either by the impact of the wheels resting thereon with the curbs, or by the operation of lever $16^t$. The car is then driven over the rear supporting mechanism in the position shown by Fig. 4, and the rear wheels are gripped and held by the parts in the position shown by Fig. 3, in which position either rear wheel can be stopped by the application of brakes $14^w$ by means of levers $15^w$. With the car in this position over the pit, and the engine running, the plugs in the different lubricant cases are removed by means of the plug wrench shown in Figs. 31 to 33, with the drip pans $14^d$ in position below the cases to catch the drippings and convey them by means of the pipe $1^d$ to the filtering and clarifying system shown in Fig. 1.

A number of different hose connections $1^o$ are made with the lubricant directing nozzles $2^o$ of the lubricant cases, and with the attachment $14^o$ of the engine oiling apparatus as shown in Fig. 36, by means of the clamping devices, as shown in Figs. 26, 27, and 28. The operator in the pit opens the plug valves $22^v$ to the position where the latch $31^v$ indicates "old oil", thereby opening the port 26ᵛ of each valve to the pipe 1ᶜ as shown in Fig. 22. This allows the cleansing oil from the gravity tank 19ᶜ to flow through pipes 20ᶜ, heaters 21ᶜ, and pipes 22ᶜ, and then through valve plug 22ᵛ to the lubricant cases. The valve 25ᵛ is adjusted until a suitable amount of oil will flow from the gravity tank and when this is established, the hand wheel can be removed so valve set will not be altered. This lubricant is or may be heated, and if desirable or necessary the lubricant case to be cleaned may also be warmed or heated by hot blast apparatus H as shown in Fig. 1 and in detail by Fig. 37, loosening the grease, gum, and dirt so it will be carried away by the cleaning oil or fluid.

The quantity and kind of lubricant required or used in any lubricating case of the automobile is obtained from the records by the operator of this system who is on the floor above the pit, and he sets the replenisher that supplies the kind of lubricant required to admit a predetermined quantity of lubricant to that particular lubricant case and by operating the lever 5ᵛ the man in the pit can open his plug valve 22ᵛ to receive oil whenever he is ready. The plunger 2ʳ is weighted and to raise it and refill cylinder 1ʳ air or fluid under pressure must be admitted through valve 3ᵛ from pressure pipe 2ᵛ into cylinder 5ʳ. The plunger 2ᵛ and pointer 12ʳ are raised simultaneously until the cylinder is filled, then the scale 13ʳ is slid in its support 14ʳ so the pointer indicates the proper amount of lubricant to be supplied. The cylinder 1ʳ may be large enough so the scale 13ʳ may be set many times before refilling, the scale being lowered each setting until it strikes bottom at 29ʳ and then the cylinder 1ʳ does not contain the desired amount and must be refilled. To refill, the valve operating lever 5ᵛ is moved to position Fig. 18 which allows vent 4ᵛ to close and starts to open air valve 3ᵛ, the lost motion in block 9ᵛ not yet allowing contact with head of oil valve 12ᵛ. When in position Fig. 19 the lost motion in block 9ᵛ will be entirely taken up, air valve 3ᵛ will be well opened and valve 8ᵛ may raise same as check if piston 6ʳ is raising, then when upward motion of lifting members 7ᵛ is noted, valve 8ᵛ would be lifted off its seat by block 9ᵛ when lever 5ᵛ is moved to position shown in Fig. 20. In the closed position, Fig. 14, the travel of rod 10ᵛ is limited when the thrust of spring 11ᵛ is taken by valve 8ᵛ resting on its seat.

After each lubricant case is thoroughly cleaned the pitman closes plug valve 22ᵛ which passes one of the air pipe connections 32ᵛ on the way to the shut off position and clears the hose 1ᶜ and parts of the cleaning oil. After closing the valve 22ᵛ, the case plugs are replaced and valve 22ᵛ is opened to new oil. When the pitman observes that the new oil valves 16ᵛ are closed the valve 22ᵛ is moved past the air blowout port and to its closed position. In setting the replenishing parts, the operator above the floor sets the lever 20ʳ above the tripping end 16ʳ (Figs. 13 and 15) of the swinging support 14ʳ, which opens one of the spring pressed valves 16ᵛ (Fig. 21) so that as soon as the pitman throws the hand wheel to the "new oil" position the lubricating case is filled from the cylinder 1ʳ through pipe 30ʳ and through a valve 16ᵛ. As soon as the proper amount of lubricant flows into the lubricating case, the engagement of pointer 12ʳ with the cam 19ʳ moves the scale support 14ʳ and releases lever 20ʳ which allows valve 16ᵛ to close shutting off the supply of new oil. The record of the kind and quantity of lubricant for each receptacle would be established when car is fitted for this cleaning and replenishing system, and both the car owner and the parties doing this cleaning would have a copy of same.

The automobile has now had the old lubricant removed, the cases thoroughly cleaned and replenished, and is ready to be driven away; the back wheels are locked, but as soon as the pitman has the supply hose 1ᶜ, drip pans 14ᵈ and hot blast out of the way he releases the latch 20ʷ which locks the wheel holding devices, thereby closing the energizing signal circuit for the signal device or lamp 24ʷ. The operator above the floor then releases the lever 8ʷ which returns the locking members to the position shown by Fig. 4 and by putting brakes upon wheels 1ʷ by means of brake levers 15ʷ, the automobile can by its traction be driven or moved off, and the same operation performed upon the next car.

As every operation is done systematically the cars then can be cleaned quickly and thoroughly without even stopping the engine, if desired; and while the cleaning operating is taking place one of the back wheels may be stopped, without stopping the engine, for inflating the tire. The operator in the pit and the one on the floor both have certain duties to perform, but the control of the various parts is so arranged that it is practically impossible to make a mistake, as each operation follows in such sequence that one is a check upon the other.

I claim:

1. An automobile lubricant case cleaning system comprising means for circulating a cleaning fluid through said case, and appliances for receiving the discharged cleaning fluid from said case.

2. An automobile cleaning and replenishing system comprising appliances for receiving used lubricant from the automobile lubricant cases, means for circulating cleaning liquid through said cases and discharging it into said appliances, and means for replenishing said cases with new lubricant.

3. An automobile cleaning system comprising receiving means for used lubricant from the automobile lubricant cases, lubricant clarifying apparatus into which said means discharges, and circulation apparatus for causing the clarified lubricant to pass through said cases to clean them and to discharge therefrom into said receiving means.

4. An automobile cleaning and replenishing system comprising means for receiving used lubricant from the automobile lubricant cases, apparatus for clarifying said used lubricant, circulating means to return the clarified lubricant to said cases for cleaning them and discharging into said means, and replenishing means for delivering a predetermined quantity of new lubricant to each of said cases.

5. An automobile lubricant case cleaning system comprising means for receiving used lubricant therefrom, clarifying apparatus to which said lubricant passes, means including a pump for circulating the clarified lubricant through said cases and said receiving means to clean the cases, and a lubricant heating apparatus for warming the cleaning lubricant before it reaches the cases to be cleaned.

6. In a system of the class described, means for temporarily draining the lubricant containers and for returning said lubricant with other lubricant to clean said containers, means for clarifying the lubricant before returning it to the containers, means for shutting off said cleaning lubricant, and replenishing means for filling the containers with clean lubricant.

7. In an automobile lubricant cleaner and replenisher, an oil clarifier, drip receivers for delivering oil to the clarifier, an overhead tank, a pump for delivering clarified oil to the tank, tubular means for conveying cleaning oil from the tank to the automobile and thence to the drip receivers for reuse, and means for heating said cleaning oil before it reaches the automobile.

8. In an automobile lubricant cleanser, drip receiving means disposed below an automobile to be cleaned, a drip receiving tank, a separator having a floating feeder in said tank, separate tanks for said separator, and circulating means for returning the clarified lubricant to said automobile and to said drip receiving means.

9. In an automobile lubricant cleaner and replenisher, the combination with a primary source of clean oil, and means for predetermining the replenishing supply, of a supply of cleaning oil, drip receiving means for the used oil, embodying a drip tank, a separator connected with said drip tank, separate tanks into which said separator discharges clean and dirty oil, means for replenishing the supply of cleaning oil from the said clean oil tank, and a common admission pipe both for said replenishing and the cleaning oil.

10. In an automobile cleaning and replenishing system, a circulating system for cleaning oil, a source of supply of replenishing oil, and a flexible hose common to the cleaning and replenishing oils having valved means for permitting the passage of either one or the other.

11. In an automobile lubricant cleanser and replenisher, an open pit over which the car is stationed, means for securing the car in this position, means operated from the pit for draining the oil containers of the car, means for supplying clarified oil for cleaning the containers, and measuring replenishers for supplying clean oil to said containers when they are cleaned.

12. The combination with an automobile lubricant case cleaning system comprising means for circulating cleaning fluid in said case, and means for discharging said cleaning fluid, of automobile supporting means to permit movement of the parts within said lubricant case without movement of the automobile.

13. In an automobile lubricant cleaner, detachable means for admitting cleaning oil to the lubricant container, means for directing the cleaning oil upon dirt and oil deposits within the container, means for keeping the container drained, and means for permitting the automobile driving parts to be in motion during the cleaning.

14. In an automobile lubricant cleaner, detachable means for admitting cleaning oil to the lubricant container, means for heating the cleaning oil, means for directing the cleaning oil upon dirt and oil deposits within the container, means for keeping the container drained, and means for permitting the automobile driving parts to be in motion during the cleaning.

15. In an automobile lubricant cleaner, detachable means for admitting cleaning oil to the lubricant container, means for directing the cleaning oil upon dirt and oil deposits within the container, means for keeping the container drained, and means to allow the continued operation of the automobile driving parts including the wheels during the said cleaning, and means for stopping either drive wheel.

16. In an automobile lubricant cleaner; cleaning oil connections for supplying oil, and drip connections for receiving the cleanings; the said connections interfering with the free movement of an automobile away from said cleaner; a plurality of cleaner operating points and a plurality of automobile locking points, each of said locking points preventing the automobile from being moved until all are unlocked.

17. The combination with automobile lubricant holding receptacles and means for supplying and discharging liquid cleaning fluid to and from same, of external connections at said receptacles, and a clamping device at the end of said oil supply adapted to engage with said connections.

18. The combination with automobile lubricant holding receptacles having external connections for receiving the cleaning fluid and means for discharging said cleaning fluid; of a cleaning fluid supply having a clamping device to connect said cleaning fluid supply with said external receptacle connection.

19. In combination with automobile working mechanism and a container of lubricant reused over said mechanism; means for admitting a cleaning liquid into said container, a discharge from said container of insufficient size to discharge a like amount of lubricant at normal temperatures and means for heating said lubricant so it will flow through said discharge as rapidly as cleaning liquid is admitted.

20. In combination with an automobile lubricant container cleaning system, means for directing a cleaning fluid upon the moving parts, means for draining said cleaning fluid from the lubricant container and means for permitting movement of the lubricated parts within said case but preventing movement of the automobile.

21. In combination with an automobile lubricant container cleaning system comprising a circulating supply of cleaning fluid and means for draining the container, of means for shutting off the circulating oil and closing the drain of said container, and means for injecting into said container a fixed quantity of lubricant.

22. In combination with an automobile lubricant container cleaning system comprising a circulating supply of cleaning fluid and means for draining the container, of means for shutting off the circulating oil and closing the drain of said container, means for injecting into said container a fixed quantity of lubricant and a measuring device for said injected lubricant graduated as to quantity and value.

23. In apparatus for removing, cleaning, and replenishing lubricant for automobiles, a source of cleaning oil, a source of clean oil, a single flexible tube to feed either kind of oil, and a single supply valve for directing either kind of oil to the flexible tube.

24. In apparatus for removing, cleaning, and replenishing lubricant for automobiles, a source of cleaning oil, a source of clean oil, a source of air pressure supply, and a single connection from these three supplies to the automobile lubricant container and with valve means for discharging air through this single connection to eject the contained oil.

25. In an automobile lubricant container cleaning and replenishing system, means for draining said case, a source of cleaning oil supply, a source of air under pressure, a source of clean oil supply, a single connection that delivers both oils to said container, and means for ejecting either oil from the single connection by discharging air through it to the container.

26. In apparatus of the class described, a cleaning oil connection, a clean oil connection, and an air pressure connection between the two oil connections, a common valve housing for said connections, and a valve therefor having a single inlet movable to register with one of the said connections, and having a single outlet, the valve and outlet being cleared of one kind of oil by the air blast before the inlet port can register with the other oil connection.

27. In apparatus of the class described, a circular valve housing, a cleaning oil connection at one side thereof, a clean oil connection at the other side, an air connection at one side of each oil connection, a shut-off position between each air connection and the opposite oil connection, and a valve rotatable in said housing to register with any connection, with a common discharge therefor.

28. The combination with an automobile lubricant container, its lubricant circulating system and means for draining said container; of an independent external supply of cleaning oil, said external supply being directed by streams to the internal parts.

29. The combination with an automobile lubricant container, its lubricant circulating system, means for draining said container, and means for admitting an outside supply of cleaning liquid; of a system for delivering the cleaning liquid to said container and receiving the discharge therefrom.

30. The combination with an automobile lubricant container, its lubricant circulating system, means for draining said container, and means for admitting an outside supply of cleaning liquid; of a system for delivering the cleaning liquid to said container and receiving the discharge therefrom, and means for clarifying said cleaning liquid.

31. The combination with an automobile lubricant container, its lubricant circulating system, means for draining said container, and means for admitting an outside supply of cleaning liquid; of a system for delivering the cleaning liquid to said container and receiving the discharge therefrom, and means for heating said cleaning liquid.

32. The combination with an automobile lubricant container, its lubricant circulating system, means for draining said container, and means for admitting an outside supply of cleaning liquid; of a system for delivering the cleaning liquid to said container and receiving the discharge therefrom, and means for heating said containers.

33. The combination with an automobile lubricant container, its lubricant circulating system, means for draining said container, and means for admitting an outside supply of cleaning liquid; of a system for delivering the cleaning liquid to said container and receiving the discharge therefrom, the delivery supply from said system having a clamp connection for attachment to the cleaning liquid distributing system of said container.

34. In apparatus for removing, cleaning, and replenishing lubricant of automobile lubricating casings, the combination of a fitting extending from the outside through the wall of the casing, said fitting having an external head, a tubular feeding pipe, and clamping means at the end of the pipe to engage and make a fluid tight connection with said head.

35. In apparatus for removing, cleaning, and replenishing lubricant of automobile lubricating casings, the combination of a fitting extending from the outside through the wall of the casing, said fitting having a rounded outer head, a tubular oil feeding member, and a clamping device at the end of said member having a seat corresponding to said outer head.

36. In apparatus of the class described, a distributing fitting applicable to a lubricant casing to be cleaned and replenished, having a nozzle with a plurality of holes for streams of oil at one end, a clamping head at the other end, and a threaded intermediate portion for attachment to a casing.

37. The combination with a lubricating casing and means for normally reusing the lubricant therein, of a fitting inserted through the wall of the casing having a plurality of holes at the inner end to direct streams of oil into the casing, a self closing valve in the fitting, and a secondary source of lubricant supply attachable to said fitting.

38. The combination with a lubricating casing, of a fitting inserted therethrough for introducing a secondary lubricant with an external joint face, a tubular member supplying lubricant to the fitting also having a plain joint face, and a clamping device for drawing these joint faces firmly together.

39. The combination with a lubricating casing and means for normally removing lubricant therefrom and delivering it to mechanism to be lubricated, a drain to discharge lubricant from said casing, and an outside source of lubricant supply applicable to said means between the said removing means and the mechanism for introducing other lubricant to the mechanism and to said casing.

40. The combination with an automobile having a lubricating casing, and a pump for circulating lubricant therefrom to the parts to be oiled, a drain to discharge lubricant from said casing, and an outside source of supply of oil with means for attachment between the pump and said parts to be oiled.

41. In combination with a lubricant container and its normal circulating means for lubricating the parts, a drain for said container which removes the lubricant from said normal circulating means, an outside supply of container cleaning liquid, and an outside supply of lubricant for the circulating means.

42. In combination with automobile lubricant containers, means for admitting a cleaning fluid into same, drain plugs that are removed to permit flow through said containers, said plugs being of different sizes with uniform undercut grip ends, and a single means to engage the grip ends of the different sized drain plugs.

43. In an automobile for reusing lubricant from one of its casings, a drain plug at the bottom of the casing, auxiliary means for supplying lubricant to the automobile parts when the drain plug is removed, and a drip pan under the casing having a hole therein to permit the removal of the drain plug therethrough.

44. In an automobile lubricant casing cleaner, the combination of a cleaning lubricant supply from without the casing, and a drain receptacle for receiving fluid from the casing movable vertically and transversely to position the receptacle under the casing.

45. In an automobile lubricant casing cleaner, the combination of a cleaning lubricant supply from without the casing, a removable drain plug for the casing, a receptacle for receiving fluid from the drain plug opening, and a jointed rotatable support for the receptacle by which it may be adjusted to a position under the plug opening.

46. The combination with an automobile lubricant casing, of a removable drain plug at the bottom, a cleaning lubricant supply, a drain receptacle, a casing in which the receptacle fits tightly and is vertically adjustable, and a jointed rotatable support for the casing having a passage therethrough to carry off the lubricant from the casing.

47. The combination with an automobile lubricant casing having a removable bottom plug, of means for feeding a cleaning lubricant thereto, a drain for carrying off said cleaning fluid when the plug is removed, and means for alining said drain and the bottom plugged opening.

48. The combination with an automobile lubricant casing having a removable bottom plug, of means for feeding a cleaning lubricant thereto, a drain for carrying off said cleaning fluid when the plug is removed, and means for directing a hot blast against the casing to assist in loosening the dirt and lubricant therein.

49. The combination with an automobile lubricant casing having a removable bottom plug, of means for feeding a cleaning lubricant thereto, a drain for carrying off said cleaning fluid when the plug is removed, and an adjustable hot air pipe for directing an air blast against any portion of the casing for loosening lubricant and dirt therein.

50. The combination with an automobile lubricant casing having a removable bottom plug, of means for feeding a cleaning lubricant thereto, a drain for carrying off said cleaning fluid when the plug is removed, and a hot air pipe with rotatable and jointed connection for moving the pipe clear of the said drain and adjustable to reach the entire surface of the casing.

51. The combination with an automobile lubricant casing having a removable drain plug at the bottom, of means for carrying off the lubricant when the plug is removed, means for supplying a cleaning lubricant to the casing, and heating means for the cleaning lubricant supplied to the casing.

52. In apparatus of the class described, the combination with an automobile lubricant casing having a removable bottom drain plug, of means for feeding a cleaning lubricant thereto, heating means for the cleaning lubricant, and means for heating the casing to assist the cleaning lubricant in loosening and removing dirt from the casing.

53. An automobile lubricant replenishing system comprising appliances for receiving used lubricant from the automobile, means for circulating clean oil in the automobile, and means for delivering a predetermined quantity of clean lubricant to take the place of the used lubricant discharged therefrom.

54. The combination with means for removing lubricant and cleaning and replenishing the lubricant cases of an automobile by circulating lubricant therein while the automobile driving parts are in operation, of an established support for the automobile, and means for allowing rotation of the driving wheels but locking the automobile against movement during the cleaning and replenishing operations.

55. In an automobile for re-using lubricant from one of its casings, means at the bottom of the casing for opening it to drain the lubricant therefrom, auxiliary means for supplying lubricant to the automobile parts when the other said means is removed, and a drip pan under the casing having an opening therein to permit the adjustment of the means at the bottom of the casing which permits the draining of the lubricant therefrom.

In testimony whereof I have signed my name to this specification, on this 5th day of September, 1916.

WILLIAM L. MORRIS.